July 13, 1926.
A. J. JOHNSON
WEEDING IMPLEMENT
Filed Oct. 5, 1925
1,592,270
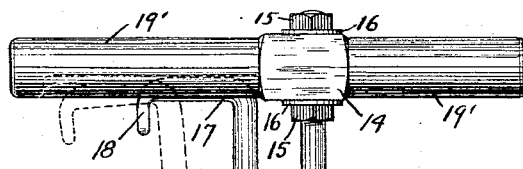
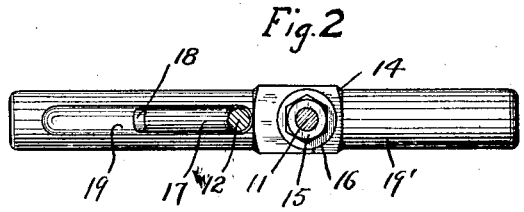
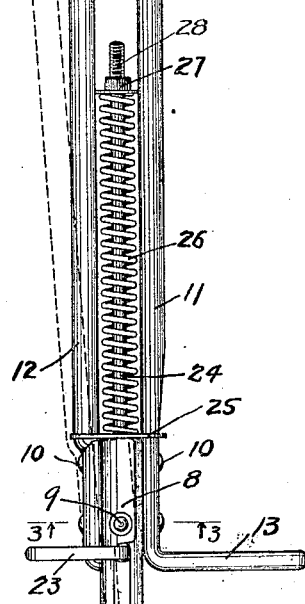
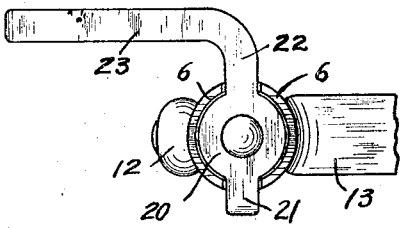
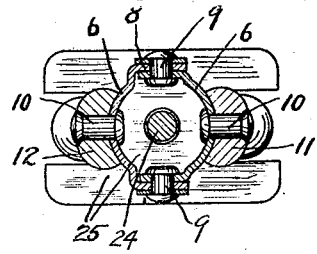
INVENTOR.
Albert J. Johnson
BY
Louis O. French
ATTORNEY.

Patented July 13, 1926.

1,592,270

UNITED STATES PATENT OFFICE.

ALBERT J. JOHNSON, OF MILWAUKEE, WISCONSIN.

WEEDING IMPLEMENT.

Application filed October 5, 1925. Serial No. 60,484.

The invention relates to weeding implements, and more particularly to that type of implement which may be actuated by the operator in a standing position.

The object of the invention is to provide a weeder of the type above described which will enable the operator to take out long-rooted weeds in an expeditious manner and permit ready removal of the weeds from the implement, and to improve upon the weeding implement described and claimed in my United States Letters Patent No. 1,548,040, issued August 4, 1925.

The invention further consists in the several features hereinafter set forth, and more particularly defined by claims at the conclusion hereof.

In the drawings, Fig. 1 is an elevation view of a weeding tool embodying the invention;

Fig. 2 is a detail sectional view taken on the line 2—2 of Fig. 1, looking in the direction of the arrows;

Fig. 3 is a detail sectional view taken on the line 3—3 of Fig. 1, looking in the direction of the arrows;

Fig. 4 is a bottom end view, parts being broken away;

Fig. 5 is a detail elevation view of the lower end of the implement, showing the extractor in its lowered position.

The device includes a pair of blades 6, each semi-tubular in cross-section and provided with pointed lower ends 7, said blades having apertured ears 8 to take the pivot bolts or rivets 9. One of the blades 6 is connected by rivets 10 to the lower end of a rod 11; the other blade is similarly connected to the lower end of a rod 12. The lower end 13 of the rod 11 is flattened and bent at an angle thereto to form a foot-rest for forcing the blades into the ground. The upper end of the rod 11 is threaded and passes through a hole in a handle 14 to which it is clamped by nuts 15 on said threaded end, engaging washers 16 adjacent the handle.

The upper end 17 of the rod 12 is bent laterally and this laterally-extending portion has a flattened end member 18 bent outwardly therefrom. The lateral portion 17 works in a slot 19 formed in the handle and this slot limits the swinging movement of the rod 12, and hence the movement of the blade carried thereby, relative to the other blade. The handle has handle portions 19' which the operator grasps in operating the tool.

The construction thus far described operates similarly to that of my issued patent above mentioned but the modified arrangement of the member 12 relative to the handle is considered to facilitate the operation of the blades over that of my prior patent as it is an easy matter for the operator, as he grasps the handle adjacent the member 17, to move the member 12 laterally without releasing his hands from the handle.

In order to extract the weed and the soil that clings to it from between the two blades 6, a plate 20 having guides, here shown in the form of a lug 21 and a lug 22 having an extended foot portion 23, is slidably mounted between the blades and connected to a rod 24 centrally disposed relative to the blades and to a spring-seat plate 25, and a spring 26 is interposed between said plate 25, which rests on the top of the blades, and a nut 27 mounted on the upper threaded end 28 of the rod 24.

In operation, with the blades as shown in full lines in Fig. 1, the operator centers the blades over the dandelion or other weed to be extracted and then by pressure from the handle, aided by pressure of his foot on the rest 13, the blades are driven into the soil around the root of the weed, to the desired depth, after which the operator pushes the upper end 18 of the rod 12 from its full toward its dotted line position, thereby closing the blades 6 about the root which is then lifted from the soil and thereafter the rod 12 may be returned to its initial position and by pressing his foot on the rest 23 the operator may move the plate 20 outwardly toward the ends of the blades to the position shown in Fig. 5 so that the extracted root and the soil clinging to the same is ejected from between the blades.

I desire it to be understood that this invention is not to be limited to any particular form or arrangement of parts except in so far as such limitations are included in the claims.

What I claim as my invention is:

1. In a weeding tool, the combination with a pair of pivoted semi-tubular digging blades, a handle, rods secured at their lower ends to said blades, one of said rods being secured to said handle, the other rod having movement relative thereto, an extractor member working in the space between the blades and having lugs extending between the side edges of the blades, one of said lugs having a foot portion for movement of said member, a rod secured to said member and extending upwardly between the blades, and a spring associated with said last-named rod for moving said extractor member to an inoperative position, said spring and rod being interposed between said first-named rods.

2. In a weeding tool, the combination with a pair of pivoted digging blades, rods secured to said blades, a handle secured to one of said rods having a recess therein, the rod of the other blade having a laterally-extending portion working in said recess and engageable with the inner end thereof to limit the outward movement of the blade, said laterally-extending portion of said rod having a depending hand-engaging part extending below said recess.

3. In a weeding tool, the combination with a pair of pivoted digging members including semi-tubular blades and supports for said blades, a handle secured to one of said supports, a laterally-projecting foot-pressure member at the lower end portion of the tool, an extractor member working between the semi-tubular blades and provided with a laterally-projecting foot-pressure member, and spring means for returning said extractor member to an inoperative position.

4. In a weeding tool, the combination with a pair of pivoted digging members including semi-tubular blades and supports for said blades, a handle secured to one of said supports, means for moving the other support relative to the handle whereby to move the blades relative to each other, an extractor member disposed and working in the space between the blades, means for operating said extractor member, and a laterally-projecting foot-pressure member secured to one of the blades.

In testimony whereof, I affix my signature.

ALBERT J. JOHNSON.